US006985444B1

(12) United States Patent
Rosen (10) Patent No.: US 6,985,444 B1
(45) Date of Patent: Jan. 10, 2006

(54) BINNING OF RESULTS FROM LOOP QUALIFICATION TESTS

(75) Inventor: Joseph S. Rosen, Chicago, IL (US)

(73) Assignee: Teradyne, Inc., Boston, MA (US)

( * ) Notice: Subject to any disclaimer, the term of this patent is extended or adjusted under 35 U.S.C. 154(b) by 691 days.

(21) Appl. No.: 09/692,169

(22) Filed: Oct. 19, 2000

Related U.S. Application Data

(60) Provisional application No. 60/209,057, filed on Jun. 2, 2000.

(51) Int. Cl.
*H04L 12/26* (2006.01)

(52) U.S. Cl. .................... 370/241; 370/904; 375/224; 379/1.04; 379/27.01; 379/27.03

(58) Field of Classification Search ........ 370/241–242, 370/248, 252, 493–494; 375/224–228; 379/1.03–1.04, 379/27.01–27.03
See application file for complete search history.

(56) References Cited

U.S. PATENT DOCUMENTS

| 5,528,661 | A | | 6/1996 | Siu et al. ........................ 379/27 |
|---|---|---|---|---|
| 5,699,402 | A | * | 12/1997 | Bauer et al. .............. 379/29.09 |
| 5,790,523 | A | * | 8/1998 | Ritchie et al. ............... 370/241 |
| 6,002,671 | A | * | 12/1999 | Kahkoska et al. ........... 370/248 |
| 6,014,425 | A | * | 1/2000 | Bingel et al. ............. 379/26.02 |
| 6,091,713 | A | * | 7/2000 | Lechleider et al. .......... 370/248 |
| 6,181,775 | B1 | * | 1/2001 | Bella ........................ 379/29.01 |
| 6,209,108 | B1 | * | 3/2001 | Pett et al. ...................... 714/43 |

(Continued)

FOREIGN PATENT DOCUMENTS

| WO | WO 99/63427 | 12/1999 |
|---|---|---|
| WO | WO 00/41331 | 7/2000 |

OTHER PUBLICATIONS

Binde, United States Patent Applications Publication, Jul. 11, 2002, Method for Double-Ended Line Qualification and Monitoring of XDSL Links.*

(Continued)

*Primary Examiner*—Brian Nguyen
*Assistant Examiner*—Tri H. Phan (57) ABSTRACT

The present invention provides a method and apparatus for performing line qualification tests, and binning the results of such testing. The lines are tested to determine or estimate various characteristics of the line. Physical characteristics of the line may be estimated (e.g. line length, line gauge, insertion loss). The presence of devices on the line such as load coils, bridged taps, terminations and the like may also be determined. A prediction of the data rate the loop can support is made from the measured and estimated line conditions. The results are binned according to certain criteria and to provide an easily discernable status of the line. The binning can be performed by a computer using software designed specifically for this purpose. The binned results may include a first category indicating the line cannot support a certain level of high speed access. The binned results may also include a second category indicating the line can support a certain level of high speed access. The results may also include a third category indicating the line cannot currently support a certain level of high speed access but would be able to upon removal of an impediment. A fourth category indicating the characteristics of the selected line fall outside the area of coverage of the test system may also be included. Each category may be assigned a respective color in order to make the status of the line easily discernable. The testing and binning may be performed for a variety of different high speed access levels. Customers can be charged different rates dependent upon the level of service made available to them.

36 Claims, 4 Drawing Sheets

U.S. PATENT DOCUMENTS

| | | | |
|---|---|---|---|
| 6,292,468 B1 * | 9/2001 | Sanderson | 370/241 |
| 6,292,539 B1 * | 9/2001 | Eichen et al. | 379/1.04 |
| 6,389,109 B1 * | 5/2002 | Schmidt et al. | 379/1.04 |
| 6,445,733 B1 * | 9/2002 | Zuranski et al. | 375/231 |
| 6,456,694 B1 * | 9/2002 | Posthuma | 379/1.04 |
| 6,463,126 B1 * | 10/2002 | Manica et al. | 379/27.01 |
| 6,466,647 B1 * | 10/2002 | Tennyson | 379/1.04 |
| 6,507,870 B1 * | 1/2003 | Yokell et al. | 709/225 |
| 6,614,880 B1 * | 9/2003 | Lysaght et al. | 379/21 |

OTHER PUBLICATIONS

Chang et al., United States Patent Application Publication, Mar. 13, 2003, Telecommunications Transmission Test Set.*
Hedlund et al.: "DSL Loop Test" Telephony, Chicago, IL, US, vol. 235, No. 8, Aug. 24, 1998, pp. 48-52, XP002147002; ISSN: 0040-1656; the whole document.

* cited by examiner

BINNING OF RESULTS FROM LOOP QUALIFICATION TESTS

CROSS REFERENCE TO RELATED APPLICATIONS

This application claims priority to provisional U.S. Patent Application 60/209,057 filed Jun. 2, 2000.

BACKGROUND OF THE INVENTION

This invention relates generally to communication networks and more particularly to systems for qualifying telephone lines for data transmission.

As is known in the art, public switch telephone networks, i.e., so-called plain old telephone service (POTS) lines, were originally designed for voice communications which cover a limited frequency bandwidth (i.e., about 4 KHz). Today, it is desired to use the same POTS lines for data transmission. Data signals, however, generally have different frequency characteristics than voice signals, including bandwidths that are orders of magnitude larger. As a result, a POTS line that works well transmitting voice signals might not work well, or at all, for data signals. Telephone companies need to know which lines are suitable, i.e., qualified, and which lines are not suitable for data transmission. Telephone companies also need to know why particular lines are unable to support data transmissions and where such faults occur so they can determine whether the transmission line can be corrected.

Line Qualification is the overall ability to make statements about the quality of a subscriber loop as it relates to its ability to deliver voice communications (i.e. POTS), or data services. Of particular interest herein is the qualification of lines to support high speed data transmission, such as ISDN, SDSL, ADSL or HDSL. Pre-disqualification is the ability to make a statement with a high degree of confidence that a subscriber loop will not support a data service without remedial actions. Pre-qualification is the ability to make a statement with a high degree of confidence that a subscriber loop will support a data service.

Telephone operating companies (TELCO's) have two problems to solve in qualifying subscriber loops for delivery of data. The first problem is strategic. Telco's are reluctant to deploy emerging technologies for the delivery of data (e.g., ISDN or ADSL) because there is uncertainty in their knowledge that sufficient of the subscriber loops are of high enough quality to make deployment economically successful. This discourages early adopters because there is significant risk in being first to deliver a technology that may not work in their access network. If Telco's could be given a technology to take much of this risk out of initial deployment, they can secure market share and lead in the face of competition.

The second problem is tactical and comes after a Telco has made a decision to deploy a particular technology. There is a need to qualify, either pro-actively or reactively, specific lines for service as that service is requested by subscribers or targeted by the Telco for delivery, or the Telco may be compelled by regulation to provide sufficiently capable lines to CLEC (Competitive Local Exchange Carrier). For example, if a Telco were to market and deliver the new service, they would like to target those subscriber loops most likely to support the service out of the box and/or with a minimum of work. As another example, a Telco receiving a new service request from a subscriber desires information to either accept or reject that request for new service based on the condition of their line.

Line qualification is generally done with single-ended or double-ended testing. For double ended testing, a technician is dispatched to each end of the line under test. The line being tested is disconnected from the network and test equipment is installed at both ends of the line. The test equipment cooperates to determine whether the line supports the required type of data transmission. Double-ended testing is not desirable because of the time and cost associated with having test equipment at both ends of the line. Additionally, double-ended testing often provides results that are specific to a particular type of data service so that the testing has to be repeated if the type of data services changes.

For xDSL line qualification, two approaches are currently used. One approach is to dispatch a technician to the upstream side of the line under test, such as at the Central Office (CO) or Digital Loop Carrier (DLC). The technician disconnects the line under test and then connects a series of special purpose instruments, such as a load coil detector or a time domain reflectometer to detect bridge taps or a digital multimeter to locate resistance faults. This approach gives only an incomplete indication of signal loss on the line—which we have recognized is a very important predictor of line performance—and is too time consuming and expensive to use for wide spread deployment of a particular type of high speed data service.

Others have tried to do single-ended pre-qualification using automated measuring equipment developed for testing lines for faults that effect voice service and relying on records telephone companies keep of their lines to provide additional information. The cable information can indicate if the line has been configured in a way that is known to be unsuitable for a particular data service. For example, records of the wire gauge of the line and whether a load coil is installed might indicate that the line will not support a certain type of service. However, the review of the cable records has generally been done manually, resulting in unacceptable long test times. In addition, telephone companies have generally found that the required records are inaccurate, because the required information was entered incorrectly or never updated. Moreover, line characteristics that impact speed of digital data services did not necessarily cause any degradation of traditional voice services. For many years, there was no reason for a telephone company to keep records of the information they would now need to qualify lines for high speed data services. Therefore, the cable records often do not contain the required information.

As a result of the limitations of presently available line pre-qualification techniques, phone companies are not able to predict with a high level of confidence whether their lines will support certain types of data services. These limitations have forced service providers to restrict their offering of high speed data services to particular regions where they believe the lines are capable of supporting them or to only promise customers that the services will operate at less than their full possible speed.

If a telephone company could determine, quickly and inexpensively, which lines support high speed data services and the speed at which those lines will operate, it would be a significant advantage for that company.

SUMMARY OF THE INVENTION

With the foregoing background in mind, it is an object of the present invention to provide a method and apparatus for performing line qualification tests, and binning the results of such testing. The lines are tested to determine or estimate various characteristics of the line. Physical characteristics of the line are estimated (e.g. line length, line gauge, insertion loss). The presence of devices on the line such as load coils, bridged taps, terminations and the like may also be determined. A prediction of the data rate the line can support is made from the measured and estimated line conditions. Thus the behavior of the line at a low frequency (less than 100 KHz) is used as a proxy to estimate the behavior of the line at high frequencies (greater than 100 KHz.). The testing and measuring are preferably performed at low frequencies such that they can be performed through the voice switch of the TELCO. The results are binned according to certain criteria and to provide an easily discernable status of the line. The binning can be performed by a computer using software designed specifically for this purpose.

In a preferred embodiment, the binned results include a first category indicating the line cannot support a certain level of high speed access. The binned results also include a second category indicating the line can support a certain level of high speed access. The results also include a third category indicating the line cannot currently support a certain level of high speed access but would be able to upon removal of an impediment. A fourth category indicating the characteristics of the selected line fall outside the area of coverage of the test system may also be included. Each category is assigned a respective color in order to make the status of the line easily discernable. The testing and binning may be performed for a variety of different high speed access levels. Customers are charged different rates dependent upon the level of service made available to them on their line.

BRIEF DESCRIPTION OF THE DRAWINGS

The invention will be better understood by reference to the following more detailed description and accompanying drawing in which.

DETAILED DESCRIPTION

There currently exists a large demand for providing high-speed access such as Integrated Services Digital Network (ISDN) or various types of Digital Subscriber Line (xDSL) service for subscribers to the Internet. Most of these subscribers desire to receive this access through their existing POTS (Plain Old Telephone Service) lines. POTS lines were originally built to carry voice, and not necessarily the higher frequencies associated with ISDN or xDSL. Some percentage of POTS lines are capable of providing high-speed access desired by subscribers. Predicting the ability of existing POTS lines to support high-speed access is typically labor intensive, requires a great deal of time, and requires a skilled person to interpret the results.

The present invention provides for automated testing of existing POTS lines to estimate the capability of the line to provide high-speed service and further to present the results of the testing in an easily discernable format. The testing performed on the line as part of the characterization of the line can take a variety of different measurements and estimates. Characteristics of the line which are estimated by the testing may include insertion loss of the line, phase imbalance of the line, the length of the line and the line gauge. Additional characteristics determined by the line testing may include the determination or estimation of the presence of gauge changes, bridged taps, load coils and other path elements such as splitters, filters, terminations and the like. Additionally, speed disturbers—that is other high-speed services within the cable bundle—may also be taken into account. A second part of the line testing involves utilizing a process to predict the data rate the line will support based upon the measured and estimated characteristics. Additionally, the prediction dependability and coverage may be included as part of the test results. A description of the line characteristics determined or estimated by the test process follows.

Given that a telephone line has no other parasitic conditions, the operation of the service on the line is significantly influenced by the overall attenuation or insertion loss of the line to the signal applied. Currently telephone companies measure insertion loss by deploying personnel to either end of the wire pair to measure the insertion loss at different frequencies (e.g. 100 KHz, 300 KHz, etc.) through hand held instruments. The present test system includes a method for estimating the insertion loss of a line from single ended measurements of the line.

Phase imbalance of a line is also an important consideration in estimating the capability of the line to handle high-speed access. A telephone line is made up of a two wire pair, called Tip and Ring. Ordinarily, the Tip and Ring wires should have the same electrical properties. It is desirable for the lines to be balanced. In a balanced line, the resistance, capacitance and inductance of each wire are equal. Imbalances exist if capacitance, inductance, or resistance of one of the wires differ from the other. An imbalance introduces a differential phase shift between the two wires of the loop. Higher speed modems encode many bits into phase shifts on carrier frequencies. Thus even minor instabilities of the imbalance cause reduced data throughput, errors, and retraining. With ISDN, the shifts in phase cause energy from one pulse to overlap into the synchronization signal or into the time occupied by another pulse, thus causing inter symbol distortion and/or loss of synchronization. Both analog and digital transmission methods are susceptible to minor instabilities in phase imbalance. It is important to detect imbalance because large imbalance values affect POTS by reducing loop current levels. It is possible that a resistance imbalance might be so large, (2 kilo-ohms or more) that seizing a dial tone may not be possible, or the ringing current might not be sufficient to activate the bell circuitry in the telephone or modem. It is equally important to detect imbalance at values below 2 kilo-ohm when data transmission is concerned. Any series resistance and the noise that it causes in terms of phase shift have a detrimental effect on the data throughput that may be achieved on that subscriber loop.

Line length, line gauge and presence of gauge changes along the line can be estimated through testing and measurements of the line or through TELCO records. The length of the line plays a role in high speed access since the line may be too long to support high speed access. The gauge of the line and any changes in the gauge of the line also effect the ability of the line to support high speed access. Gauge changes are seen as impedances and can affect high speed signals being transmitted on the line.

The telephone network was often optimized for POTS signals. One way that the network was optimized was through the inclusion of load coils on telephone lines. The load coils improved the frequency response of the lines for analog signals. A load coil on a line will create a reflection that affects the ability of the line to handle high speed service.

In the United States, many subscriber lines have bridged taps because of the way in which telephone lines were laid out in housing subdivisions. Telephone lines were laid out prior to determining the exact positioning of the houses of the subdivisions. The lines ran near planned positions of several houses. When the houses were later built, the builder connected the telephone units to the nearest point on one of the originally laid telephone lines. Unconnected portions of the original lines produced bridged taps. The bridged tap reflects signals from a termination. The reflected signals then travel back to the subscriber line and interfere with signals on the subscriber line. The most harmful interference occurs when the reflected signal is out of phase with the incoming signal. In such a case, the reflected signal destructively interferes with the incoming signal on the subscriber line.

The length of the bridged tap dictates the phase difference between the original and reflected signals. For high-speed digital signals whose frequencies extend to about 1 mega Hertz (MHz), e.g., ADSL signals, a substantial cancellation can occur if the bridged tap has a length between about 200 to 700 feet. In the United States, the bridged taps left over from the construction of many housing subdivisions have lengths in this range. Thus, the ability to detect and remove the bridged tap is useful to TELCO's that want to offer high-speed digital data services to their subscribers.

With the introduction of new services such as ADSL, it may not be possible to have any foreknowledge if the Central Office (CO) of a telephone company will be equipped to handle the provision of these new services to subscribers. For example, standard test systems could be fooled into thinking there are ringers on a subscriber's line if the line under test is equipped with splitters and a half ringer but has no phone. ADSL adds a CO splitter and a premises splitter in series with the line. The CO Splitters use of diodes provides both polarity sensitivity and a threshold of conduction that falls outside the realm of ADSL signals.

For the CO splitter current can only flow if the Ring side is more positive than the Tip side. None of the measurements performed by known test systems allow for this condition. Therefore these presently employed test systems cannot detect a properly installed CO Splitter. In order to accurately characterize a line it is important to determine or estimate the presence of the elements residing on the line.

A line model for the loop is created from physical measurements taken on the line, preferably with an automatic measurement system installed in the telephone network. In the preferred embodiment, the line model includes loop information including its length, wire gauge, indications of bridge taps, and indications of load coils and its attenuation. Techniques for deriving this loop information are described in various patent applications assigned to Teradyne, Inc. or are included in commercially available products, such as Celerity, sold by Teradyne Telecommunications Division in Deerfield, Ill., USA. Preferred techniques can be found in U.S. patent applications: 09/294,563 filed Apr. 24, 1999 by Groessl et al.; 09/410,236 filed Sep. 30, 1999 by Rudinski et al.; 09/410,222 filed Sep. 30, 1999 by Faulkner et al.; 09/409,141 filed Sep. 30, 1999 by Holeva et al.; and 09/410,237 filed Sep. 30, 1999 by McGill et al. The foregoing applications are hereby incorporated by reference.

Further, the model could also include information that is sometimes referred to as DC fault information. Such faults can be detected with DC measurements on the line. This information includes tip-ground fault; ring-ground fault; cross faults. The model of the line also includes a measurement of low frequency noise and an evaluation of what kind of terminations are on the line, such as mechanical or electronic phones or network interface devices. Such faults and conditions can be detected with commercially available products, such as 4-TEL II sold by Teradyne Telecommunications Division of Deerfield, Ill., USA, but other products are commercially available to make these measurements. Further information on how to obtain such information can be found in U.S. Pat. No. 5,699,402, which is hereby incorporated by reference.

These measurement techniques are preferred because they allow determination of line conditions using relatively low frequency measurements. Using low frequency measurements allows the test system to be switched to a particular line through existing switches, which generally have low frequency responses. For example, to make a direct measurement of a bridged tap, a bandwidth of at least 300 KHz is required. As will be described below, the performance of a line can be predicted using low frequency measurements and predictions.

Which items are included in the line model is not an important limitation of the invention. In general, more information will lead to a more accurate binning of the line, but will also take more time and require more complex measurement equipment or software. Further, which quantities are most helpful at predicting performance will vary from network to network. For example, bridge-taps are far more prevalent in the US than in many European countries. So, it might be important for the line model when used in the US include an indication of whether bridge-taps are present, but such quantity would not be important when used on networks in Europe. It is anticipated that a preferred set of line measurements and characteristics will be selected partially through the use of empirical evidence.

To bin a particular line into an appropriate category, two additional models are created. One model characterizes the noise on the line. The other defines the capabilities of modems to be used for the high speed digital service.

In contrast to the information about a particular line derived from measurements on that line, the noise model is preferably derived from information about the way a particular network is operated by the local telephone company. While measuring actual noise on the line could be used as a possible alternative implementation, it is difficult to measure high frequency or wide-band noise with existing automated measuring equipment. Such equipment is often connected to the line through a switch that has low pass frequency response, making it difficult to measure high frequencies in the high frequency or wide-band noise. For example, a bandwidth of 1.1 MHz is required for direct measurement of wide-band or impulse noise. Automatic connection of a test system to a line using existing switching equipment is unlikely to provide sufficient band-width for reliably making the required noise measurements.

A model for noise can alternatively be derived from information about how a telephone company operates its network. A major source of noise on a telephone line is cross talk. Telephone lines are generally routed from a central office to the general vicinity of the subscriber in a cable bundle. Lines to all of the subscribers in the vicinity are also contained within the cable bundle. Signals on each line in the cable bundle couple to other lines in the cable bundle. While efforts are made in the design of the cable to reduce the amount of signal that couples from one line to another, there is still some signal coupled, and the coupled signal is termed cross-talk noise. The amount of coupling from one line to another depends on the frequency of the signals transmitted and the amount of cross-talk noise therefore depends on what other types of signals are carried in a cable bundle.

Service providers follow design rules about the combinations of signals that are carried in a cable bundle. They might, for example, specify a maximum number of lines that can be dedicated to ADSL or T1 or other signals that carry high frequency signals to ensure that there are not too many high frequency signals causing cross-talk noise. Based on the service provider's design rules, an estimate of the maximum noise that can be expected on a particular line can either be calculated or derived through experiments.

In order to predict the performance of a given line for high speed data services, it is important to quantify the effect of noise in a frequency range that impacts that type of service. For example, noise in the 100–200 KHz range impacts ISDN, SDSL and HDSL, but ADSL is sensitive to noise up to 1.1 MHz and T1/E1 noise. Thus, in the preferred embodiment, the noise model will include noise de-rating factors for each type of data service that the line under test might carry. These factors are determined by estimating, either through calculation or based on measurements made on representative cable bundles, the noise that will appear in the frequency range used by each data service. There is a different de-rating factor for each combination of other disturbing signals in a cable bundle, for each service (ISDN, xDSL), with some combinations usually taken as typical by a service provider. Noise models may be defined on a per CO or DLC switch element basis. This allows noise models to be customized for the typical data services and loop profiles found in any specific locale.

The estimated noise de-rating factor might be expressed in decibels and could be analogized to additional loss on the line. The appropriate noise factor could be added to the attenuation for a particular line resulting in a noise-corrected attenuation. For example, let the noise model indicate an ISDN noise factor of 6 dB at 100 KHz for some combination of disturbing signals, and the line measurements indicate an attenuation of 25 dB at 100 KHz for a particular line. As part of the process of speed binning that line for ISDN service, the attenuations could be combined so that the line model would indicate a noise-corrected attenuation of 31 dB at 100 KHz. However, in the embodiment illustrated herein, the noise model is kept separate from the line model and is used in a manner as described below.

A de-rating factor from a particular noise model is used along with the predicted attenuation of the line when determining what speeds the line will support. However, this is accomplished in the context of analysis as part of the (speed) binning process detailed below.

In the preferred embodiment, each noise model is organized as tables. For each service type (ISDN, ADSL, SDSL, and so on) there is a row of entries in a noise model table with entries of de-rating factors in decibels for various combinations of disturbing signals (4 T1, 8 ADSL, and so on). Each column in the table corresponds to a different combinaton of disturbing signals. There could be a separate table defined for each CO or DLC.

In addition to line characteristics and noise characteristics, data rates are influenced by the particular modems used on the line. A modem is required at the subscriber end of the line. A second modem is required at the central office or Digital Loop Concentrator (DLC) at the other end of the line. The noise and line characteristics impact different modems differently. Thus, a model must be provided of the modem pair.

For a given noise model and line model one can characterize the upstream and downstream data rates that a given CO or DLC modem and customer site modem pair can provide. These rates vary with length, generally decreasing as the length of the loop increases. The specific relationship between length and data rates varies between different vendor's modems and also varies between line models of the same length and different construction (combination of bridged taps, gauge mix, and so on). A modem model defines, for each of a set of canonical line models, the upstream and downstream speed of a given CO/DLC and customer site modem pair for a given noise model (configuration of disturbing signals).

In the preferred embodiment, a canonical line model is one of the following:

1) a single gauge loop (0.32 mm, 0.4 mm, 0.5 mm, 0.6 mm, 0.8 mm, 26 AWG, 24 AWG, 26 AWG) in a twisted pair or twisted quad cable. A distinct model exists for each discrete length from 500 ft to some maximum length, in 500 ft. increments.
2) a mixed gauge loop with the proportion of each gauge varying from 10% to 80% of the total loop length. A distinct model exists for each discrete combination of gauges and for each discrete length from 500 ft. to some maximum length, in 500 ft. increments.
3) a set of industry and telephone operating company standard line models including those defined as CSA, MIDCSA and ANSI.

Test unit 2 is programmed with a plurality of modem models that contain information about the performance of pairs of modems that could exist on the line for which a speed prediction is being made. Preferably, there is one modem model for every pair of modems that might exist on the line. Each modem model can be organized as a table. For each canonical line model there is a row of entries in the modem model table, with entries of upstream or downstream speed for various noise models (combinations of disturbing signals). In a simple embodiment, the line model might simply be represented as a total length (including bridged taps length) and bridged tap count. Greater accuracy might alternatively be achieved by using more variables to represent a line model. For example, a line might be modeled as a list of segments. The length, wire gauge and placement of those segments, including any bridged tap segments, and whether the line includes load coils or other features might also be recorded in the model. In addition, the measured attenuation at a plurality of frequencies from 100 KHz to 1.1 MHz in decibels for the model might be included. Using more variables to describe a line model should lead to greater accuracy in binning when evaluating the line under test, but also requires a larger amount of data to be stored for a modem model.

Figure 4:
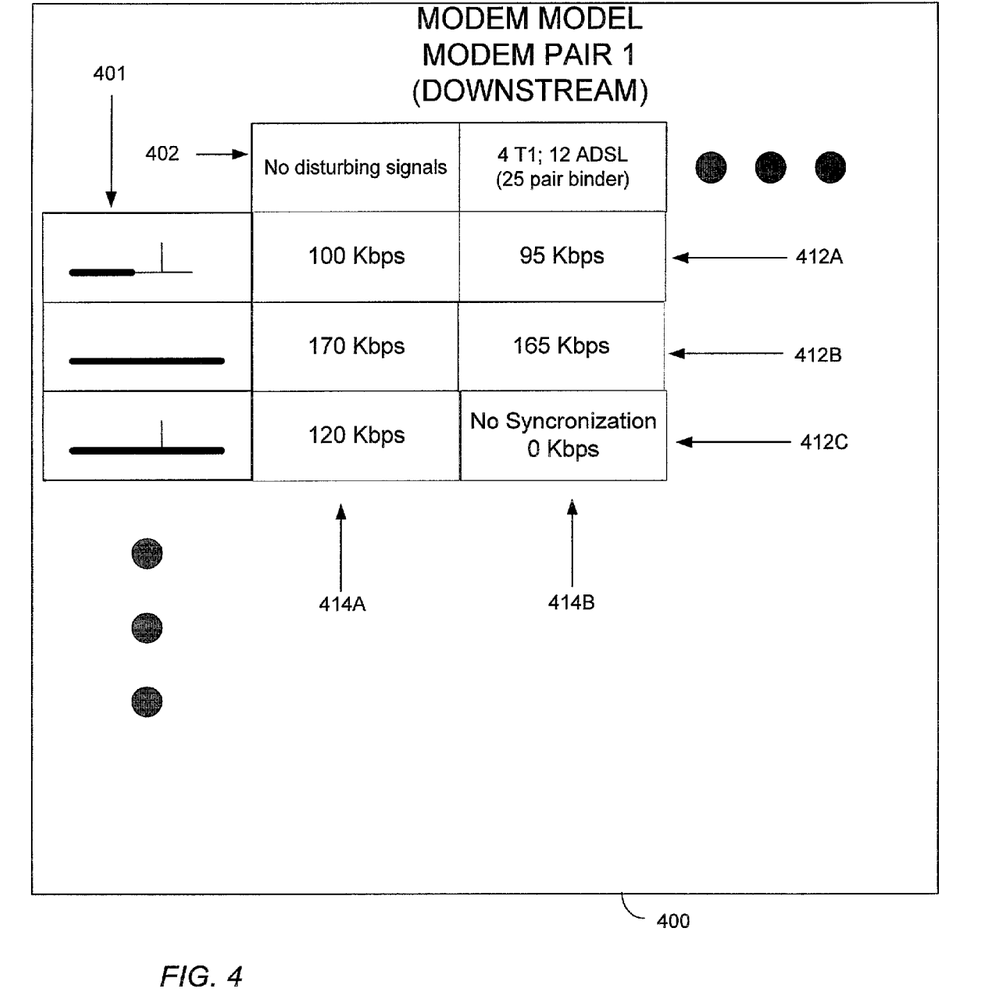
FIG. 4 is a sketch of a data structure used to represent a modem model.

Noise in a cable bundle will influence the data rate. Thus, the modem model table must include for each entry in the table different data rates that are associated with different noise levels, as identified by noise models. Each column in the table corresponds to a noise model, that is, some combination (for example, 4 T1 lines, 8 ADSL lines) of disturbing signals. As described above, the disturbing signals for any particular line are derived from operating rules about what signals can be carried on the lines in a cable bundle and the noise model is used to de-rate performance. As shown in FIG. 4, the number of disturbing signals is increasing when moving to the right in the table. Column 414A represents performance with no disturbing signals. Column 414B indicates performance when the cable bundle includes 4 T1 and 12 ADSL signals in a 25 pair cable bundle. Likewise, the predicted speed decreases as the amount of noise generated increases. Decreased speed is a result of the de-rating that occurs from noise. Thus, using the data structure of FIG. 4 to predict a data rate represents an alternative way that the noise model can be used to de-rate for performance on the line.

By indexing into the table by finding the row that is a closest match in construction to the line under test and then indexing across the columns in that row to the column that corresponds to some particular noise model, a particular table entry is selected. The selection provides the anticipated data rates for the modem pair of the construction represented by the canonical line model and the selected combination of disturbing signals.

In a preferred embodiment, the data for the entries in the modem table are derived from empirical measurements. Empirical measurements can be taken on representative lines in the field. Or more preferably, they can be taken in a laboratory setting where the line lengths and line configurations can be controlled. Each modem pair actually has two data rates associated with every operating condition—one for upstream speed and one for down stream speed. "Upstream" speed indicates that rate at which data can move from the subscriber modem to the CO modem. The "downstream" speed indicates the rate at which data can move from the CO modem to the subscriber modem. Many data services, such as ADSL are designed to have downstream data rates that are higher than the upstream data rates. Consequently, different speed predictions are required for upstream and downstream transfers. Thus, there are separate tables for upstream and downstream data rates.

FIG. 4 illustrates a data structure that might be used for a modem model for a particular pair of modems. The number of modem models required is set by the operating policies of the telephone company relating to which modems are used by the telephone company and which modems its subscribers are allowed to use. The data structure 400 is stored in computer memory in test unit 2. The illustrated model is for the downstream data rates. A similar table exists for upstream data rates. Column 401 represents the canonical line models that define the row index for the table. For simplicity of illustration, the models are represented graphically. Each model is shown to represent a line with segments of various gauges and with or without bridge taps. As described above, the line model can include many variables. In a preferred embodiment, each line model is represented using digital data representing a particular value or range of relevant variables. By matching the model built of the line under test using measurements made by test unit 2 to one of the entries in column 402, one of the data rows, such as 412A . . . 412C, is selected.

Row 402 is the index into the column of the table. Each entry across row 402 correlates to a particular noise model (combination of disturbing signals). By choosing a particular noise model one of the data columns, such as 414A . . . 414B, is selected. The selection of a row and column defines an entry in the modem table. The number of noise conditions that might exist is dictated by telephone company operating procedures because, in the illustrated embodiment, the noise model is determined by the use of the lines in the cable bundle. This selection provides the predicted data rate for the downstream transmissions on a particular line using particular modems. The process is repeated to get a data rate for the upstream portion.

The upstream and downstream speeds selected for a particular canonical line, for some noise model act as an upper bound to the speed assigned to the line under test. Further evaluation, including comparing the attenuation associated with the selected canonical line model to the predicted attenuation of the line under test (de-rated for the given noise model), leads to a speed binning determination. This evaluation also takes into consideration any construction differences between the selected canonical line model and the line under test.

In a preferred embodiment, the prediction of line speed is presented in an easy to understand format. The results of the line testing may be separated by categories or binned wherein each category represents a different condition of the line. The binning is performed by a computer using software designed for this purpose, which may be included as part of the test unit or be a stand alone system which receives data from the test unit. The categories may further be color-coded to make the test results easily discernable. While a particular set of colors is described, any color or other manner of indication could be used to identify the different categories of test results of the line testing. For example, red would indicate that the line cannot support high speed access, green indicates the line can support high speed access, yellow indicates the line cannot currently support high speed access but could if an impediment was removed and gray indicates the characteristics of the line fall outside the area of expertise of the system.

The gray characterization provides two benefits. First, it allows a human user to easily understand that the status of a particular line is unknown. Secondly, it increases the dependability of binning predictions through reducing the coverage of the testing. For example, if lines binned gray are not counted as part of the area of expertise of the system (and comprise 20 percent of the total lines tested), then a group of lines could be characterized as being predicted with 95 percent accuracy for 80 percent of the total lines tested. As used herein, "area of expertise" refers to scenarios in which the system makes a prediction which is relied upon by the user. If however lines binned gray are included as part of the area of expertise of the system, then the group of lines could be characterized as being 85 percent accurate for 100 percent of the total lines tested. Thus, rather than making a prediction of red, yellow or green when there is a high level of uncertainty associated with the prediction, the line is reported as gray, or indeterminate. This allows a user to rely with more confidence on the predictions that are red, yellow or green. For lines binned gray, the telephone operating company might choose to perform more extensive testing or might simply choose to use another line in the cable bundle.

The testing and binning of the lines is preferably performed at a variety of high speed access rates, such as ADSL at 2 Mb/sec, ADSL at 4 Mb/sec, and ADSL at 8 Mb/sec, etc. with different rates being charged dependent upon the high speed rate supported by the line. For example, a customer could be charged a first rate for receiving 2 Mb/second access, and another customer charged a different (higher) rate for receiving 4 Mb/second access. Thus, the lines can be binned for different service categories offered by the telephone company.

Mapping the line model and speed assignment to a service category assignment can be considered a second step in the binning operation. The telephone company preferably provides the business rules that allows this mapping. The telephone company provides the service categories it desires to offer. For example, if a telephone company has determined it will offer an ADSL service at 512 Kbps, a line that has been assigned a speed of greater than 512 Kbps will be binned green for this service.

If the line has been assigned a speed below 512 K, it might be assigned a red or yellow category. For example, if the line model indicates service affecting conditions on the line, such as a split pair, a bridged tap or a load coil, it is possible that the line might be repaired and then operate at a higher speed. The telephone company would provide the business model that indicates whether the telephone company desires to attempt repair on a line. A telephone company might repair a line only if the predicted speed of the line was within 50% of the desired level. Or a telephone company might indicate in the business model that it would repair a line with a bridged tap or a load coil, but would not attempt to repair a split pair. If the line model indicated a condition that the phone company would repair, the line would be binned yellow. Otherwise, a line would be binned red.

A line might be assigned to the gray, or indeterminate category, when the measurements (taken on the line do not readily map to any line model programmed into the test system. Alternatively, many of the prediction techniques given above provide confidence factors associated with the predictions. Where predictions are made with a confidence below some threshold, the line would also be binned gray. The precise confidence threshold is also a function of the telephone company's business model. For example, a phone company with many available lines would set a high confidence threshold. Even though a high confidence threshold would result in many lines being disqualified, it would be cheaper for the telephone company to simply use other lines. On the other hand, a phone company that had a shortage of lines would set a lower threshold. Even though such a setting would increase the risk of a line being placed in service that needed to be repaired or replaced later, the telephone company might make more by using more lines for high profit data services.

The specific business model for the telephone company is preferably encoded in software in the test unit.

Figure 1:
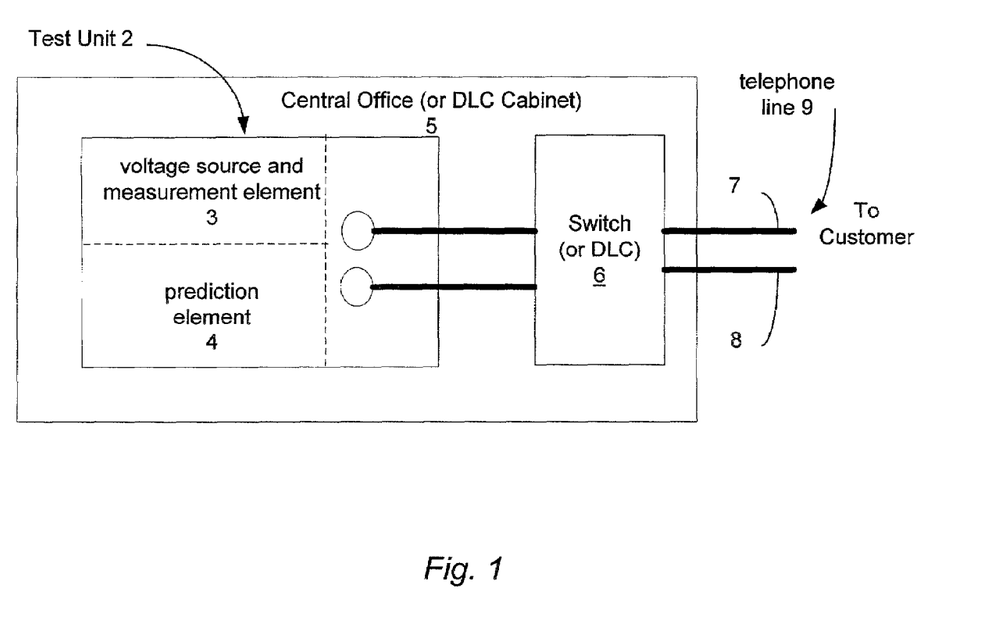
FIG. 1 is a block diagram of the apparatus of the present invention.

Referring now to FIG. 1 the present apparatus is shown. Test unit 2 includes a voltage source and measurement element 3 and a prediction element 4. Test unit 2 is located behind the switch (or DLC) 6 at central office 5 or DLC cabinet. The switch 6 connects the test unit 2 to the tip 7 and ring 8 wires of a telephone line 9. Switch 6 allows the test unit 2 to test a plurality of lines easily. The testing may be done on an as needed basis or may be done periodically.

Test unit 2 is connected to the tip 7 and ring 8 wires through switch 6. Voltage source and measurement element 3 supply a source signal to the tip 7 and ring 8 wires, and measure a variety of characteristics regarding the particular line being tested. The measurements may include voltage levels (real and imaginary), current, capacitance, impedance, resistance and the like. The measurements may be repeated at a plurality of different frequencies. Test unit 2 utilizes the measurements made by voltage source and measurement element 3 to estimate the characteristics of the line being tested. The characteristics refer to properties of the line as well as to the presence of elements on the line.

Once the characteristics have been estimated, the prediction element utilizes the characteristics to predict the data rate the line can support. The prediction process may be implemented in terms of an expert system. The expert system may utilize neural networks, statistical models, decision tree models, other models or combinations of these types of models.

The prediction element 4 may be co-located with the voltage source and measurement element 3 in the CO or DLC. Alternatively, the prediction element may be remotely located and communicate with the measurement element via a wire-line or wireless transport medium.

Once a line has been measured, the line is disconnected from the test unit 2 through switch 6 and another line can be connected to the test unit and the testing run on the next line. Once the predictions for a group of lines has been estimated, the results of the line testing may be binned as described in detail below.

Figure 2:
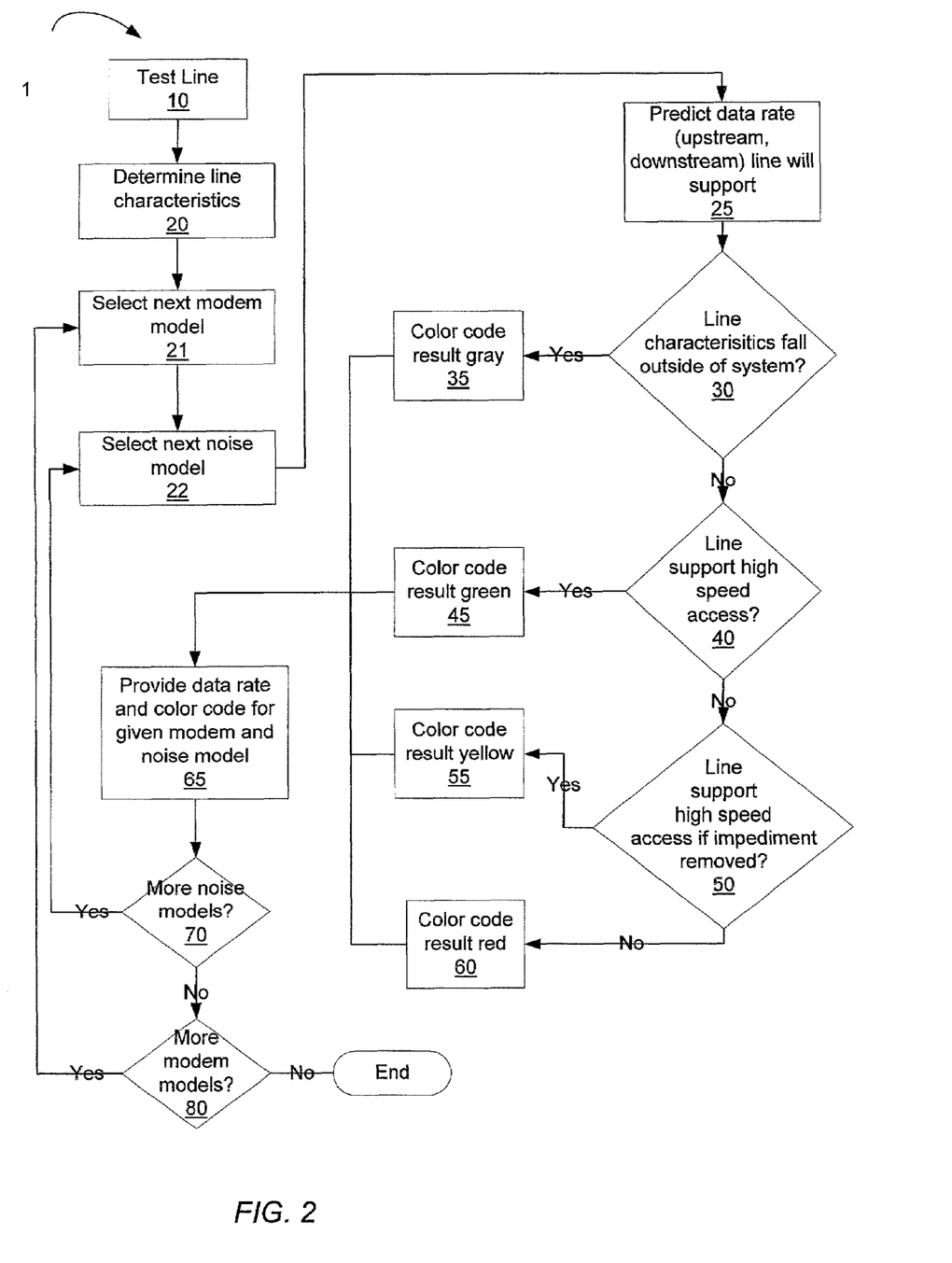
FIG. 2 is a flow chart of the method of the present invention.

Referring now to FIG. 2 the process 1 is shown. The first step of the process 10 comprises testing the line. The test unit is coupled to a selected line and inserts signals into the line, while measuring various parameters of the signal within the line and the line itself. The inserted signals may be provided at a plurality of frequencies and levels.

At the next step 20, characteristics of the line are estimated from the measurements. As an example, the characteristics include insertion loss of the line, phase imbalance of the line, the length of the line and the line gauge. Additional characteristics include the presence of gauge changes, bridged taps, load coils and other path elements such as splitters, filters, terminations and the like within or along the line path.

The next two steps establish the modem and noise contexts to use when evaluating what data rate the line will support. Step 21 selects the next (first) modem model to use then step 21 selects the next (first) noise model.

The next step 25 utilizes a process to predict the data rate the line will support based upon the measured and estimated characteristics. Additionally, the prediction dependability and coverage may be part of the test results. The process may be realized as an expert system.

Step 30 involves determining whether the line test results fall outside of the area of applicability of the system. If the line characteristics do fall outside the area of applicability of the system then step 35 is executed. At step 35 the results having this criteria are color-coded. While any color could be used for any category, in a particular embodiment gray is used to color code this category, thus making lines having this test result easy to discern. If the line characteristics do not fall outside the area of applicability of the system, then step 40 is executed.

Step 40 determines if the line test results from the test system indicate the line will support high-speed access. If this is the case, then step 45 is executed. Step 45 color-codes this result green. For any lines that are indicated as not being able to support high-speed access step 50 is executed.

Step 50 determines if the line test results from the test system indicate that the line cannot currently support high-speed access, but that the line could support high-speed access if an impediment was removed. An impediment could comprise a load coil or a bridged tap, for example. If the line could support high-speed access upon removal of an impediment, this line is color coded yellow, as shown in step 55. If the line could not support high-speed access if an impediment was removed then step 60 is executed.

Step 60 color-codes the results for the remaining lines red, indicating that the lines cannot support high-speed access. There could be several reasons for this (for example the line may be too long).

The next step, step 65, provides data rate and color code results to the user for the selected modem and noise model.

Step 70 determines whether there are more noise models to consider for a selected modem model.

Step 80 determines whether there are more modem models to consider. When there are no more modem models available, process 1 concludes. At this point, the line is assigned an upstream and a downstream data rate and color code for each possible combination of noise and modem models of importance to the service provider.

By way of the color-coded results, the users of lines that met the qualification criteria to support high-speed access may be contacted to offer high-speed access to the user. The binning may be done on a per service-grade basis. A line may be binned green for G.lite (ADSL less than 1.5 Mb/sec) but binned red for G.dmt (ADSL greater than 1.5 Mb/sec but less than or equal to 8 Mb/sec.). In this instance the red designation may be because the line is too long to support G.dmt which is the type of problem the TELCO cannot fix. While the above description discussed test results from a plurality of lines, the method is also useful when test results from only a single line are provided.

Figure 3:
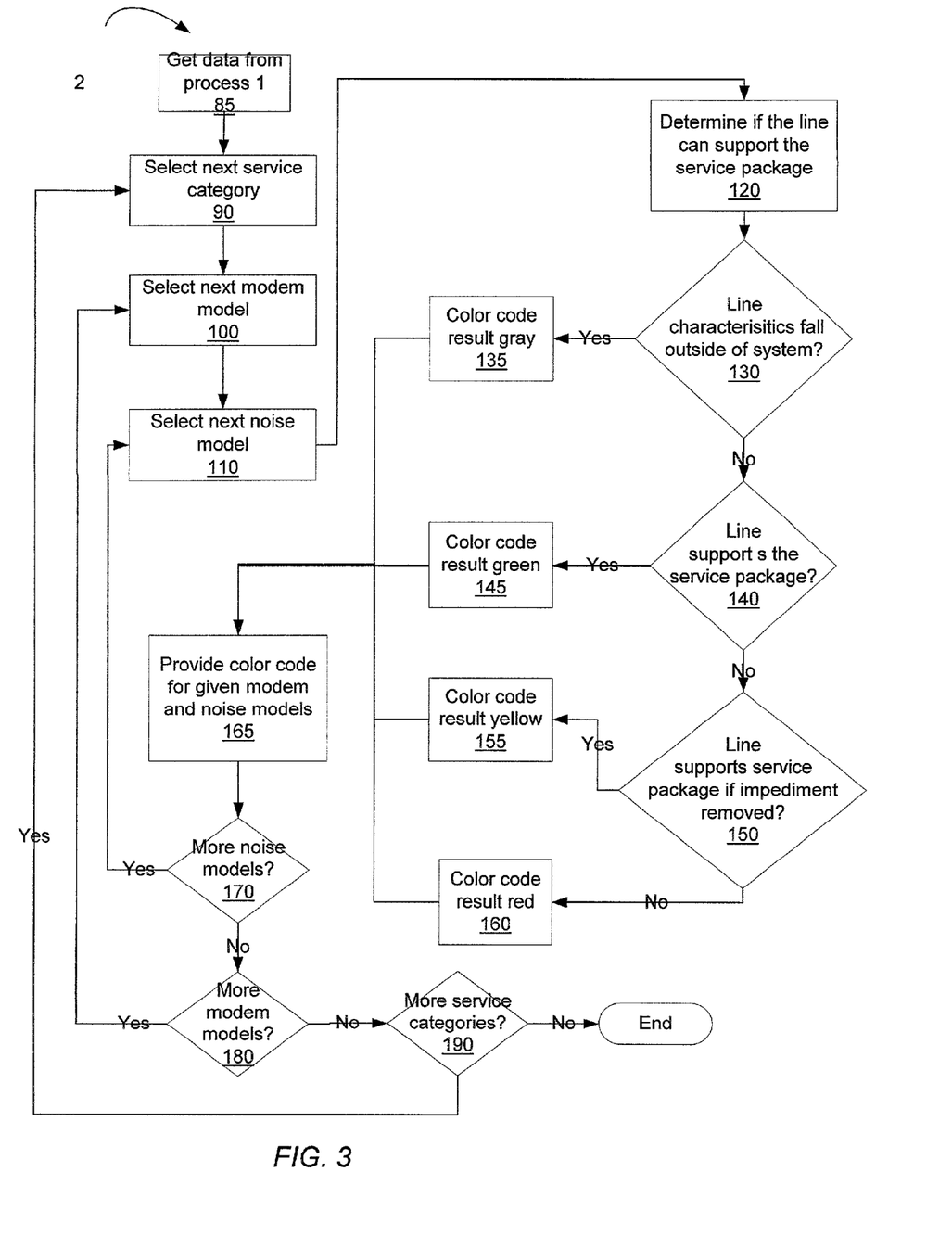
FIG. 3 is a flow chart of the method of the present invention.

Referring now to FIG. 3 the process 2 is shown. The first step 85, is to obtain the line characteristics measured and/or predicted in process 1 as well as the upstream and downstream data rate predictions for each modem model and noise model combination. The following step 90, selects the next (first) service provider defined service category. Information associated with this service category may include minimum and maximum guaranteed upstream and downstream data rates, inclusion (or not) of voice-over-xDSL service, availability of provider network bandwidth, and so on.

The next two steps establish the modem and noise contexts to use. Step 100, selects the next (first) modem model to use and then step 110 selects the next (first) noise model. The next step 120, uses the service category information along with the line characteristics and speed information to perform service category assignment, that is, to predict the capability of the line to support the service for the given modem and noise model. Additionally, the prediction dependability and coverage may be part of the assignment results. The process may be realized as an expert system.

Step 130 involves determining whether the available information (measurements, speed prediction, service capability prediction, and so on) for the line falls outside of the area of applicability of the system. If the information does fall outside the area of applicability of he system then step 135 is executed. At step 155 the results have this criteria color-coded. While any color could be used for this category, in a particular embodiment gray is used to color code this category assignment, thus making the result easy to discern. If the available information do not fall outside the area of applicability of the system, then step 140 is executed.

Step 140 determines if the available information indicates the line will support the given service for the given modem and noise model. In this case, then step 145 is executed. Step 145 color-codes this result green. For any lines that are indicates as not being able to support the given service step 150 is executed.

Step 150 determines if the available information indicates that the line cannot currently support the given service, but that the line could support the service if an impediment was removed. An impediment could comprise a speed impediment (load coil, bridged tap, and so on) or it could be a provider limitation (bandwidth, routing capacity, business policy issues, and so on). If the line could support the given service category upon removal (or otherwise addressing) the impediment, this line is color-coded yellow, as shown in step 155. If the line could not support the given service if impediments were removed then step 160 is executed.

Step 160 color-codes the results for the remaining lines red, indicating the lines cannot support the given service category. There could be several reasons for this (for example, no available DSLAM capacity exists). Lines color-coded yellow or red are associated with an explanation of why.

The next step 165, provides color code results to the user for the given service category for selected modem and noise model. Step 170 determines whether there are more noises models to consider for a selected modem model. The next step 180, determines whether there are more modem models to consider. When there are no more modem models available then the next step 190, determines whether there are more service categories to consider. When there are no more service categories to consider, process 2 concludes. At this point, the line is assigned a color code for each possible combination of service category and noise and modem models of importance to the service provider.

Having described preferred embodiments of the invention it will now become apparent to those of ordinary skill in the art that other embodiments incorporating these concepts may be used. While a particular set of line characteristics and line elements were described, other line characteristics and line elements could also be included. Additionally, the software included as part of the tool may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

Also, it should be appreciated that a two dimensional table structure was described for the modem model, with columns in the table being defined by the length of the line. It should be appreciated that the length of the line could be considered just another variable that defines the line. In this way, the two dimensional table could be visualized as a one-dimensional list.

Other data structures in computer memory are possible to store the modem model without departing from the inventive concepts. For example, it was described that a separate up stream and a down stream table were used to identify data rates. It should be appreciated that where the same noise model is used for up stream and down stream transmissions, up stream and down stream values could be obtained by simply including an up stream and a down stream data rate in each sub record of the modem model table of FIG. 4.

Also, it was described that table look-up is used to determine the data rate associated with a particular noise model. Alternatively, the data rate might be derived by computation. The noise factor might be used to de-rate the speed prediction on the line assuming noise is not present.

What is claimed is:

1. A method of preparing results from predicting the ability of an existing line to support high-speed access comprising the steps of:
   receiving the results of line testing for high speed access from a test system making single-ended measurements on a selected line; and binning the test results into one of at least three categories, wherein a first of said at least three categories indicates the selected line cannot support high speed access, wherein a second of said at least three categories indicates the selected line can support high speed access, and wherein a third of said at least three categories indicates the selected line cannot currently support high speed access but could be altered to support high speed access.

2. The method of claim 1 wherein said step of binning the test results further comprises a fourth category, wherein said fourth category indicates the test results of the selected line cannot reliably be assigned to one of the at least three categories.

3. The method of claim 1 wherein said step of receiving the results of line testing comprises receiving the results of line testing for ISDN access.

4. The method of claim 1 wherein said step of receiving the results of line testing comprises receiving the results of line testing for xDSL access.

5. The method of claim 4 wherein said step of receiving the results of line testing for xDSL access comprises receiving the results of line testing for ADSL access.

6. The method of claim 5 wherein said step of receiving the results of line testing for ADSL access comprises receiving the results of line testing for at least one of G.dmt access and G.lite access.

7. The method of claim 1 further comprising the step of color-coding each of said categories, wherein each category has a respective color.

8. The method of claim 1 wherein said step of binning the test results further comprises assigning the selected line to said third of at least three categories when the test results indicate the selected line would be able to support high speed access upon removal of an impediment.

9. The method of claim 8 wherein said impediment is selected from the group consisting of a load coil and a bridged tap.

10. The method of claim 1 further comprising the step of billing for service provided over said selected line based on the data rate supported by said selected line.

11. The method of claim 7 wherein said step of color-coding comprises coding said first of said at least three categories red, said second of said at least three categories green and said third of said at least three categories yellow.

12. The method of claim 2 further comprising the step of color-coding each of said categories, and said fourth category is color-coded gray.

13. The method of claim 1 further comprising the initial step of testing a line.

14. The method of claim 13 wherein said step of testing a line comprises the steps of:
driving said line with a signal;
measuring said line;
estimating characteristics of said line from the results of said measuring said line and
predicting a data rate supportable by said line from said line characteristics.

15. The method of claim 14 wherein said step of estimating characteristics of said line includes at least one of:
estimating an insertion loss of said line;
estimating a phase imbalance of said line;
estimating a length of said line;
estimating a gauge of said line;
determining the presence of gauge changes of said line;
determining the presence of a bridged tap on said line;
determining the presence of a load coil on said line; and
determining the presence of other path elements on said line.

16. The method of claim 15 wherein said step of determining the presence of other path elements includes at least one of:
determining the presence of a splitter;
determining the presence of a filter; and
determining the presence of a termination.

17. The method of claim 13 further comprising the step of predicting the dependability of said line testing.

18. The method of claim 13 further comprising the step of predicting the reliability of said line testing.

19. A computer program product for preparing results from predicting the ability of an existing line to support high speed access, the computer program product comprising a computer usable medium having computer readable code thereon, including program code comprising:
instructions for causing a test unit to receive the results of single-ended line testing for high speed access; and
instructions for causing said test unit to bin the results into one of a least three categories, wherein a first of said at least three categories indicates the selected line cannot support high speed access, wherein a second of said at least three categories indicates the selected line can support high speed access, and wherein a third of said at least three categories indicates the selected line has a condition creating an impediment to high speed access that can be removed.

20. The computer program product of claim 19 further comprising instructions for causing said test unit to bin the test results into a fourth category, said fourth category indicating the characteristics are undetermined.

21. The computer program product of claim 19 wherein said high-speed access comprises ISDN access.

22. The computer program product of claim 19 wherein said high-speed access comprises xDSL access.

23. The computer program product of claim 22 wherein said xDSL access comprises ASDSL access.

24. The computer program product of claim 23 wherein said ADSL access comprises at least one of G.lite access and G.dmt access.

25. The computer program product of claim 19 further comprising instructions for color-coding each of said categories, wherein each category has a respective color.

26. The computer program product of claim 19 wherein said third of at least three categories could support high speed access upon removal of an impediment on said selected line.

27. The computer program product of claim 26 wherein said impediment is selected from the group consisting of a load coil and a bridged tap.

28. The computer program product of claim 19 further comprising instructions for billing for said selected line based on the data rate supported by said selected line.

29. The computer program product of claim 19 wherein said first of said at least three categories is color-coded red, said second of said at least three categories is color coded green and said third of said at least three categories is color-coded yellow.

30. The computer program product of claim 20 wherein said fourth category is color-coded gray.

31. The computer program product of claim 19 further comprising instructions for causing a test unit to test a line.

32. The computer program product of claim 31 wherein said instructions for causing a test unit to test a line include instructions for causing a test unit to perform at least one of:
driving said line with a signal;

measuring said line;

estimating characteristics of said line from the results of said measuring said line; and predicting a data rate supportable by said lien from said line characteristics.

33. The computer program product of claim 32 wherein said instructions for estimating characteristics of said line include instructions to perform at least one of:

estimating an insertion loss of said line;

estimating a phase imbalance of said line;

estimating a length of said line;

estimating a gauge of said line;

determining the presence of gauge changes of said line;

determining the presence of a bridged tap on said line;

determining the presence of a load coil on said line; and determining the presence of other path elements on said line.

34. The computer program product of claim 33 wherein said instructions to perform determining the presence of other path elements includes instructions to perform at least one of:

determining the presence of a splitter;

determining the presence of a filter; and determining the presence of a termination.

35. A computer program product for preparing results from predicting the ability of an existing line to support high speed access, the computer program product comprising a computer usable medium having computer readable code thereon, including program code comprising:

instructions for causing a test unit to receive the results of line testing for high speed access;

instructions for causing said test unit to bin the results into one of a least three categories, wherein a first of said at least three categories indicates the selected line cannot support high speed access, wherein a second of said at least three categories indicates the selected line can support high speed access, and wherein a third of said at least three categories indicates the selected line has a condition creating an impediment to high speed access that can be removed;

instructions for causing a test unit to test a line; and instructions for causing said test unit to predict the dependability of said line testing.

36. A computer program product for preparing results from predicting the ability of an existing line to support high speed access, the computer program product comprising a computer usable medium having computer readable code thereon, including program code comprising:

instructions for causing a test unit to receive the results of line testing for high speed access;

instructions for causing said test unit to bin the results into one of a least three categories, wherein a first of said at least three categories indicates the selected line cannot support high speed access, wherein a second of said at least three categories indicates the selected line can support high speed access, and wherein a third of said at least three categories indicates the selected line has a condition creating an impediment to high speed access that can be removed;

instructions for causing a test unit to test a line; and instructions for causing said test unit to predict the reliability of said testing.

* * * * *